United States Patent
Sunada et al.

(10) Patent No.: US 9,965,624 B2
(45) Date of Patent: May 8, 2018

(54) LOG ANALYSIS DEVICE, UNAUTHORIZED ACCESS AUDITING SYSTEM, COMPUTER READABLE MEDIUM STORING LOG ANALYSIS PROGRAM, AND LOG ANALYSIS METHOD

(71) Applicants: Mitsubishi Electric Corporation, Chiyoda-ku (JP); Mitsubishi Electric Information Network Corporation, Minato-ku (JP)

(72) Inventors: Hideyuki Sunada, Tokyo (JP); Yasushi Nagata, Tokyo (JP)

(73) Assignees: Mitsubishi Electric Corporation, Chiyoda-ku (JP); Mitsubishi Electric Information Network Corporation, Minato-ku (JP)

( * ) Notice: Subject to any disclaimer, the term of this patent is extended or adjusted under 35 U.S.C. 154(b) by 0 days. days.

(21) Appl. No.: 15/116,074

(22) PCT Filed: Feb. 12, 2014

(86) PCT No.: PCT/JP2014/053179
§ 371 (c)(1),
(2) Date: Aug. 2, 2016

(87) PCT Pub. No.: WO2015/121923
PCT Pub. Date: Aug. 20, 2015

(65) Prior Publication Data
US 2017/0177861 A1      Jun. 22, 2017

(51) Int. Cl.
*G06F 21/52* (2013.01)
*G06F 21/54* (2013.01)
(Continued)

(52) U.S. Cl.
CPC ............ *G06F 21/54* (2013.01); *G06F 21/121* (2013.01); *G06F 21/30* (2013.01); *G06F 21/45* (2013.01);
(Continued)

(58) Field of Classification Search
CPC ........ G06F 21/52; G06F 21/552; G06F 21/54; H04L 63/1408
See application file for complete search history.

(56) References Cited

U.S. PATENT DOCUMENTS

| | | | |
|---|---|---|---|
| 2005/0021975 A1 | 1/2005 | Liu | |
| 2007/0220605 A1* | 9/2007 | Chien | G06F 21/552 726/23 |

(Continued)

FOREIGN PATENT DOCUMENTS

| | | | |
|---|---|---|---|
| JP | 2004-206564 A | 7/2004 | |
| JP | 2005-234729 A | 9/2005 | |

(Continued)

OTHER PUBLICATIONS

International Search Report dated May 20, 2014 in PCT/JP2014/053179 filed Feb. 12, 2014.
Extended European Search Report dated Feb. 24, 2017 in Patent Application No. 14882551.6.
Mark Curphey et al., "Improving Web Application Security: Threats and Countermeasures", Microsoft, 2003, 472 pages.

*Primary Examiner* — David J Pearson
(74) *Attorney, Agent, or Firm* — Oblon, McClelland, Maier & Neustadt, L.L.P.

(57) ABSTRACT

A log collection part of a log analysis server collects an application log from a WF server, collects an operation log from an ID control part which relays an access from an operator terminal to a business server, and which as well records access status to the business server as an operation record in the operation log, and collects an access log from the business server which records accessed status as an access record in the access log. A log analysis part deter- (Continued)

mines, based on the application log, the operation log, and the access log collected by the log collection part, whether or not the accessed status recorded as the access record is an authorized access.

10 Claims, 22 Drawing Sheets

(51) Int. Cl.
G06F 21/30 (2013.01)
G06F 21/55 (2013.01)
G06F 21/12 (2013.01)
H04L 29/06 (2006.01)
G06F 21/45 (2013.01)
H04W 12/06 (2009.01)

(52) U.S. Cl.
CPC ............. *G06F 21/52* (2013.01); *G06F 21/55* (2013.01); *H04L 63/08* (2013.01); *H04W 12/06* (2013.01)

(56) References Cited

U.S. PATENT DOCUMENTS

| | | | |
|---|---|---|---|
| 2009/0287744 A1 | 11/2009 | Bernardini et al. | |
| 2013/0198827 A1* | 8/2013 | Bhaskaran | G06F 21/552 726/7 |
| 2015/0350222 A1* | 12/2015 | Hashimoto | H04L 63/102 726/3 |

FOREIGN PATENT DOCUMENTS

| | | |
|---|---|---|
| JP | 2006-67279 A | 3/2006 |
| JP | 2008-117007 A | 5/2008 |
| JP | 2008-250728 A | 10/2008 |
| JP | 2009-75940 A | 4/2009 |
| JP | 2009-175868 A | 8/2009 |
| JP | 2009-259214 A | 11/2009 |
| JP | 2010-123014 A | 6/2010 |
| JP | 2011-70427 A | 4/2011 |
| JP | 2012-133407 A | 7/2012 |
| JP | 2012-203624 A | 10/2012 |
| JP | 2013-77182 A | 4/2013 |

* cited by examiner

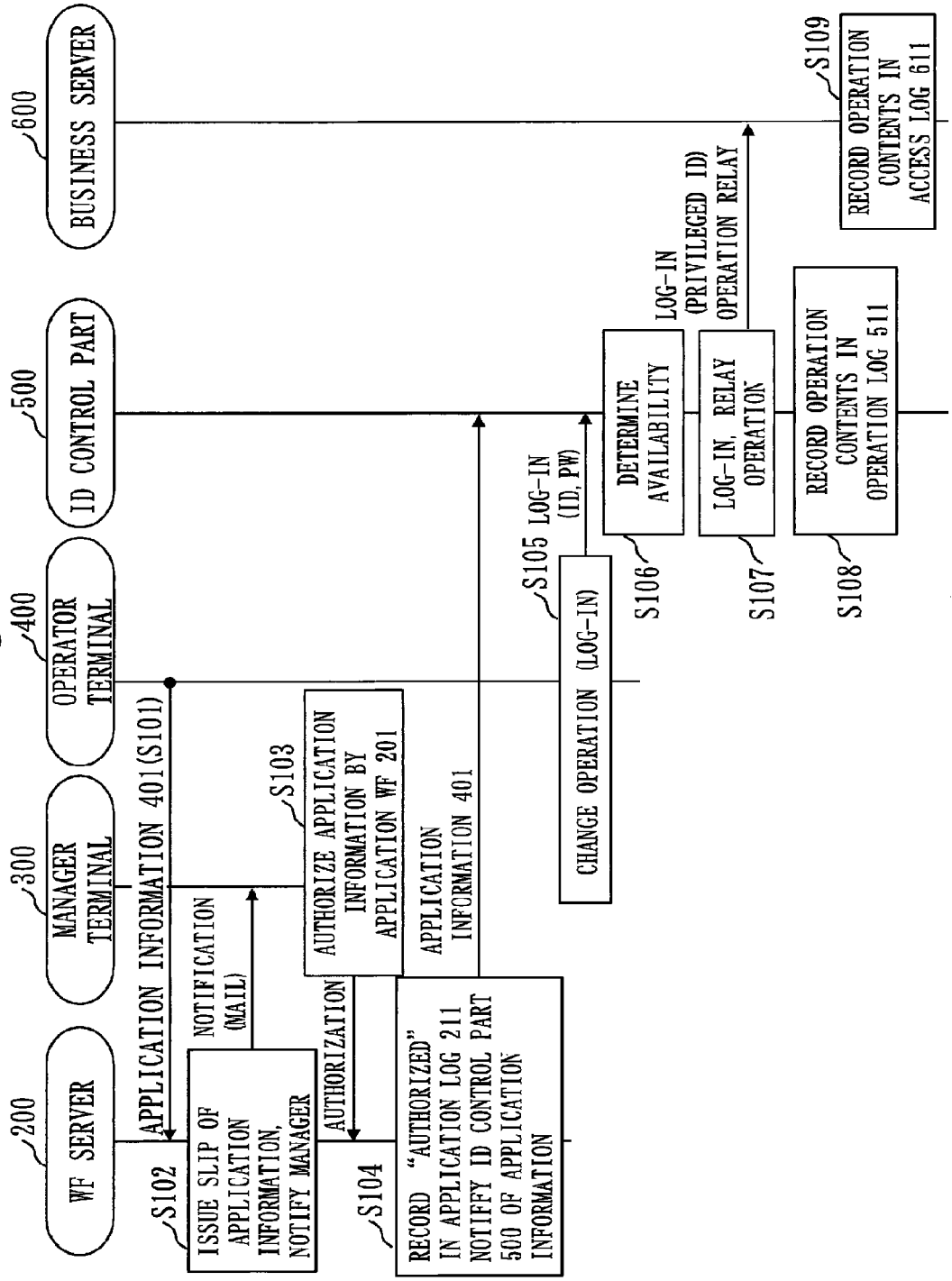

Fig. 5

| ITEM | CONTENTS |
|---|---|
| 11 PRIVILEGED ID | ACCOUNT FOR LOG-IN TO BUSINESS SERVER |
| 12 USER INFORMATION | IDENTIFIER TO IDENTIFY OPERATOR Y |
| 13 BUSINESS SERVER IDENTIFIER | IDENTIFIER SUCH AS HOST NAME OF BUSINESS SERVER TO BE LOGGED IN |
| 14 PERIOD OF USE | PLANNED PERIOD OF OPERATION TO BE CARRIED OUT ACCORDING TO APPLICATION CONTENTS |
| 15 COMMAND/PROTOCOL TO BE USED | PROTOCOL TO ACCESS BUSINESS SERVER. OPERATION TO BE CARRIED OUT ON BUSINESS SERVER (COMMAND) |

| ITEM | |
|---|---|
| PRIVILEGED ID | Admin01 |
| USER INFORMATION | Takanashi |
| BUSINESS SERVER | Host01 |
| PERIOD OF USE | 2014/01/01 08:00:00 to 2014/01/01 13:00:00 |
| COMMAND/PROTOCOL TO BE USED | RDP |

Fig. 7

| ITEM | CONTENTS |
|---|---|
| PRIVILEGED ID | ACCOUNT FOR LOG-IN TO BUSINESS SERVER |
| USER INFORMATION | SUCH AS ID TO IDENTIFY OPERATOR |
| BUSINESS SERVER | IDENTIFIER SUCH AS HOST NAME OF BUSINESS SERVER TO BE LOGGED IN |
| PERIOD OF USE | FROM WHEN TO WHEN IS OPERATION CARRIED OUT ACCORDING TO APPLICATION CONTENTS? |
| COMMAND/PROTOCOL TO BE USED | WHICH PROTOCOL IS USED TO ACCESS TO BUSINESS SERVER? WHICH OPERATION (COMMAND) IS CARRIED OUT? |
| AUTHORIZATION STATUS | AUTHORIZED OR UNAUTHORIZED OR DISMISSAL |

Fig. 8

PRIVILEGED ID, USER INFORMATION, BUSINESS SERVER, PERIOD OF USE (START), PERIOD OF USE (END), PROTOCOL, COMMAND, AUTHORIZATION STATUS (HEADING LINE)
Admin01, Takanashi, Host01, 2014/01/01 08:00:00+0900 (JST), 2014/01/01 13:00:00+0900 (JST),
Admin02, Matsuzaka, Host01, 2014/01/01 09:00:00+0900 (JST), 2014/01/01 10:00:00+0900 (JST), Telnet, yum・・(OMITTED), NG

| ITEM | CONTENTS |
|---|---|
| PRIVILEGED ID | ACCOUNT FOR LOG-IN TO BUSINESS SERVER |
| USER INFORMATION | IDENTIFIER TO IDENTIFY OPERATOR Y |
| PERIOD OF USE | |
| OPERATION CONTENTS | ※VARY ACCORDING TO PROTOCOL TO BE USED<br>IN CASE OF telnet, ETC., RECORD COMMAND TO BE USED<br>IN CASE OF RDP PROTOCOL, RECORD SCREEN IMAGE, ETC. FROM RDP TO BE PASSED |

PRIVILEGED ID, USER ID, DATE AND TIME OF START OF USE, DATE AND TIME OF END OF USE, PROTOCOL, OPERATION CONTENTS
Admin01, Takanashi, 2014/01/01 08:03:12+0900 (JST), 2014/01/01 10:08:03+0900 (JST), RDP, file://○○○ (LINK TO RECORDED VIDEO OF OPERATION CONTENTS)

Fig. 11

| ITEM | CONTENTS |
|---|---|
| USER ID (PRIVILEGED ID) | |
| OPERATION CONTENTS | INFORMATION OF OPERATION SUCH AS LOG-IN AND EXECUTED COMMAND, ETC. |
| DATE AND TIME OF OPERATION | DATE AND TIME OF IMPLEMENTING THE ABOVE OPERATION |

```
#DATE AND TIME (JST), EVENT ID, CATEGORY, DETAILS
2014/01/01 08:03:14, 0001 (LOGGED ON NORMALLY), LOG-ON, Admin・・・
2014/01/01 08:04:19, 0500 (FILE OPEN), FILE ACCESS, Admin ○○
FILE・・・・・
2014/01/01 10:08:04, 0002 (LOGGED OFF NORMALLY), LOG-OFF, Admin・・・
```

| PERSON WHO OPERATES | STATUS | APPLICATION LOG 211 | OPERATION LOG 511 | ACCESS LOG 611 |
|---|---|---|---|---|
| OPERATOR/LOG ANALYSIS SERVER | PROPER | ○ | ○ | ○ |
| | IMPROPER (UNAPPLIED) | × | × | × |
| | IMPROPER (WRONG ROUTE) | ○ | × | ○ |
| EXTERNAL PERPETRATOR | IMPROPER | △*1 | × | ○ |

Fig. 19

| PERSON WHO OPERATES | | STATUS | APPLICATION LOG 211 | OPERATION LOG 511 | ACCESS LOG 611 |
|---|---|---|---|---|---|
| OPERATOR/BUSINESS SERVER (REQUESTER) | | PROPER | ○ | ○ | ○ |
| | | IMPROPER (UNAPPLIED) | × | × | × |
| | | IMPROPER (WRONG ROUTE) | ○ | × | ○ |
| EXTERNAL PERPETRATOR | | IMPROPER | △*1 | × | ○ |

LOG ANALYSIS DEVICE, UNAUTHORIZED ACCESS AUDITING SYSTEM, COMPUTER READABLE MEDIUM STORING LOG ANALYSIS PROGRAM, AND LOG ANALYSIS METHOD

TECHNICAL FIELD

The present invention relates to, in an information system, an art to analyze and audit an access log to a business server.

BACKGROUND ART

In an auditing system using a log, a method has been mainly used, in which an access log is compared with an authority of a user himself, thereby checking whether or not there is an access or an operation to resource beyond the authority of the user. However, even if it is the operation within the authority of the user himself, the operation at an inappropriate timing (for instance, changing a module when a correction module and so on is not updated) is possible. Therefore, there is a problem that it is difficult to detect a malicious crime or an erroneous operation at the time of checking.

To solve the problem, Patent Literature 1 discussed below discloses a method to analyze and audit a log using a usage application workflow and an access log.

CITATION LIST

Patent Literature

Patent Literature 1: JP2009-75940A

SUMMARY OF INVENTION

Technical Problem

In the conventional auditing system, since the auditing is carried out using a usage application log and an access log, it is impossible to detect an access between business servers, data of which does not remain in the usage application log or an access by an external perpetrator within an applied period of use. Therefore, there is a problem that an improper access cannot be correctly detected.

The present invention aims to provide a device which properly detects an unauthorized access to the business server.

Solution to Problem

According to the present invention, a log analysis device includes:

a log collection part to collect an application log from an application log retention device retaining the application log in which a plurality of application records to apply for an access to a server device to be accessed is recorded, to collect an operation log from an access relay device which retains the plurality of application records notified from the application log retention device, receives a log-in to access the server device to be accessed from an access device, determines whether the application record corresponding to the log-in exists, if the application record exists, relays an access from the access device to the server device to be accessed, and as well records access status to the server device to be accessed by the access device as an operation record in the operation log, and to collect an access log from the server device to be accessed which records accessed status as an access record in the access log; and a determination part to determine, based on the application log, the operation log, and the access log collected by the log collection part, whether or not the accessed status recorded as the access record is an authorized access.

Advantageous Effects of Invention

The present invention enables to provide a device which properly detects an unauthorized access to the business server.

BRIEF DESCRIPTION OF DRAWINGS

FIG. 2 is a diagram of the first embodiment; and is a configuration diagram of a WF server 200, and the like.

FIG. 4 is a sequenced diagram of FIG. 3.

FIG. 5 is a diagram of the first embodiment; and illustrates contents of application information 401.

FIG. 6 is a diagram of the first embodiment; and illustrates a specific example of the application information 401.

FIG. 7 is a diagram of the first embodiment; and illustrates contents of an application log 211.

FIG. 8 is a diagram of the first embodiment; and illustrates a specific example of the application log 211.

FIG. 9 is a diagram of the first embodiment; and illustrates contents of an operation log 511.

FIG. 10 is a diagram of the first embodiment; and illustrates a specific example of the operation log 511.

FIG. 11 is a diagram of the first embodiment; and illustrates contents of an access log 611.

FIG. 12 is a diagram of the first embodiment; and illustrates a specific example of the access log 611.

FIG. 16 is a diagram of the first embodiment; and illustrates correspondence between a type of access and a log.

FIG. 19 is a diagram of the second embodiment; and illustrates correspondence between a type of access and a log.

DESCRIPTION OF EMBODIMENTS

Embodiment 1

With reference to FIGS. 1 to 16, an unauthorized access auditing system 1001 of a first embodiment will be explained.

Figure 1:
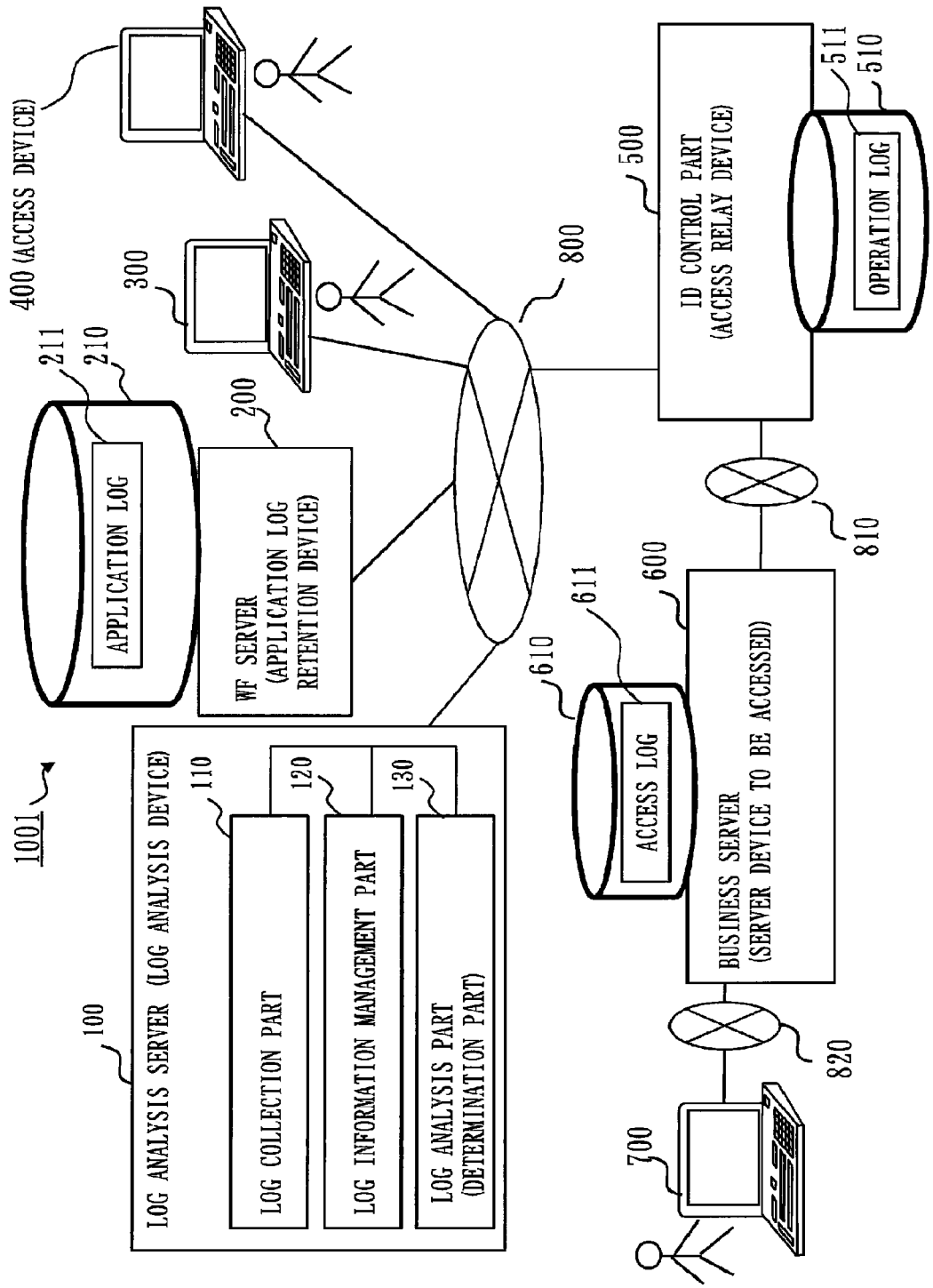
FIG. 1 is a diagram of a first embodiment; and is a configuration diagram of an unauthorized access auditing system 1001.

FIG. 1 illustrates a configuration of the unauthorized access auditing system 1001 to audit an improper access using a privileged ID.

The unauthorized access auditing system 1001 is provided with a log analysis server 100 (log analysis device), an operation application workflow server 200 (application log retention device), a manager terminal device 300, an operator terminal device 400 (access device), an ID usage control part 500 (access relay device), a business server device 600 (server device to be accessed), and a user terminal device 700. Here, the ID usage control part 500 may be included in the operation application workflow server 200.

Hereinafter, the operation application workflow server 200 is described as a WF server 200, the manager terminal device 300 as a manager terminal 300, the operator terminal device 400 as an operator terminal 400, the ID usage control part 500 as an ID control part 500, the business server device 600 as a business server 600, and the user terminal device 700 as a user terminal 700.

In the unauthorized access auditing system 1001, the log analysis server 100, the WF server 200, the manager terminal 300, the operator terminal 400, and the ID control part 500 are connected to a business network 800. The business server 600 is connected to the ID control part 500 via a management network 810. The user terminal 700 is connected to the business server 600 via a service network 820. A user transmits a request from the user terminal 700 via the service network 820 to a business application of the business server 600.

(Log Analysis Server 100)

The log analysis server 100 is provided with a log collection part 110, a log information management part 120, and a log analysis part 130 (determination part).

(1) The log collection part 110 collects a usage application log 211 (an application log 211, hereinafter), an operation log 511, and an access log 611 respectively from the WF server 200, the ID control part 500, and the business server 600.

(2) The log information management part 120 stores log information such as the application log 211 collected by the log collection part 110.

(3) The log analysis part 130 receives the log information stored by the log information management part 120 as an input and analyzes correspondence relationship of records (discussed later) recorded in each log. Through this analysis, the log analysis part 130 determines whether or not the access to the business server 600 is an improper access, and outputs a determination result.

Figure 2:
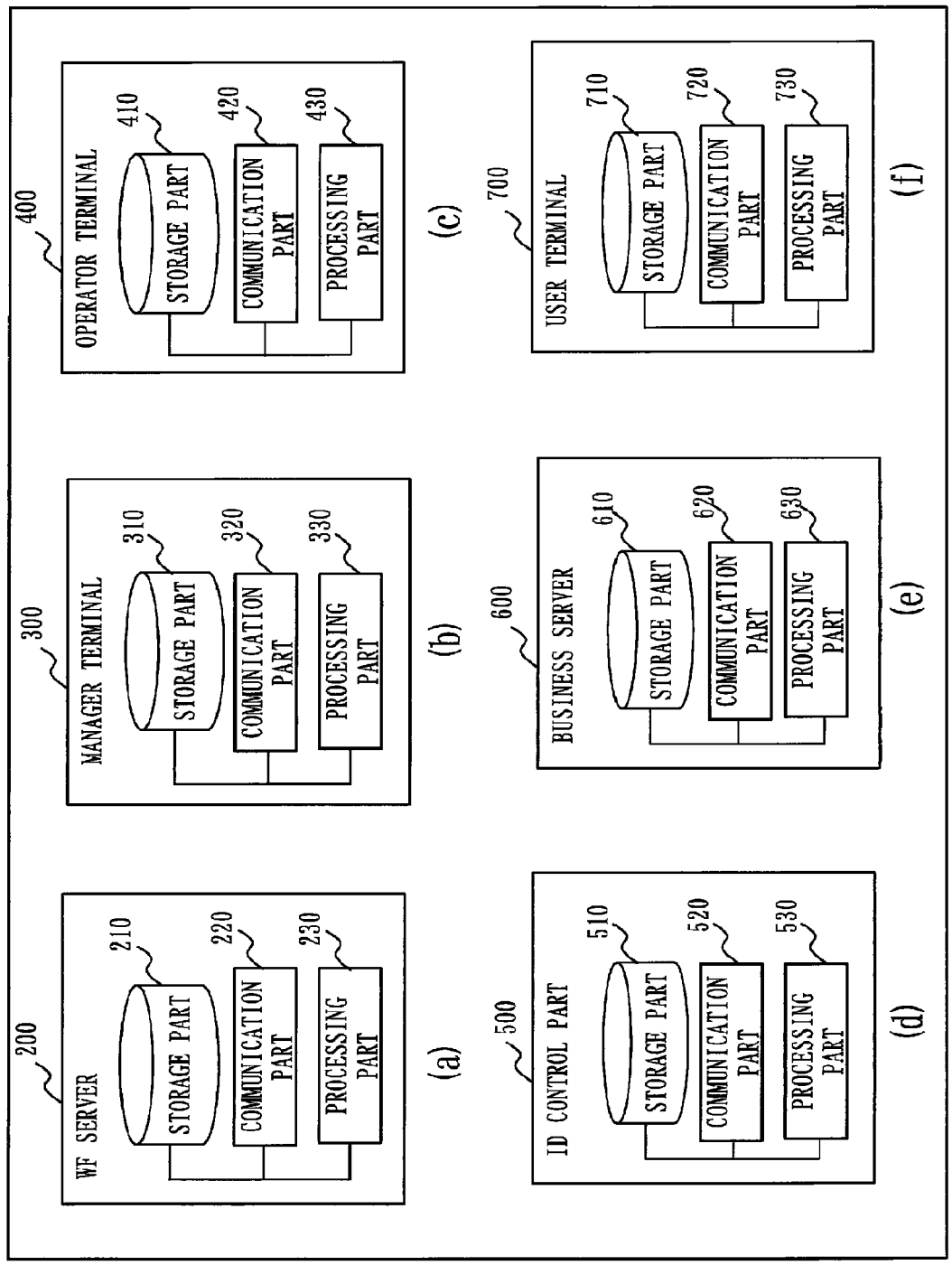

(a) to (f) of FIG. 2 illustrate the configuration of the WF server 200, the manager terminal 300, the operator terminal 400, the ID control part 500, the business server 600, and the user terminal 700. The WF server 200 and the like include a storage part, a communication part carrying out communication, and a processing part carrying out information processing.

Hereinafter, in the unauthorized access auditing system 1001, a flow of the operation related to an operator Y will be explained.

Figure 3:
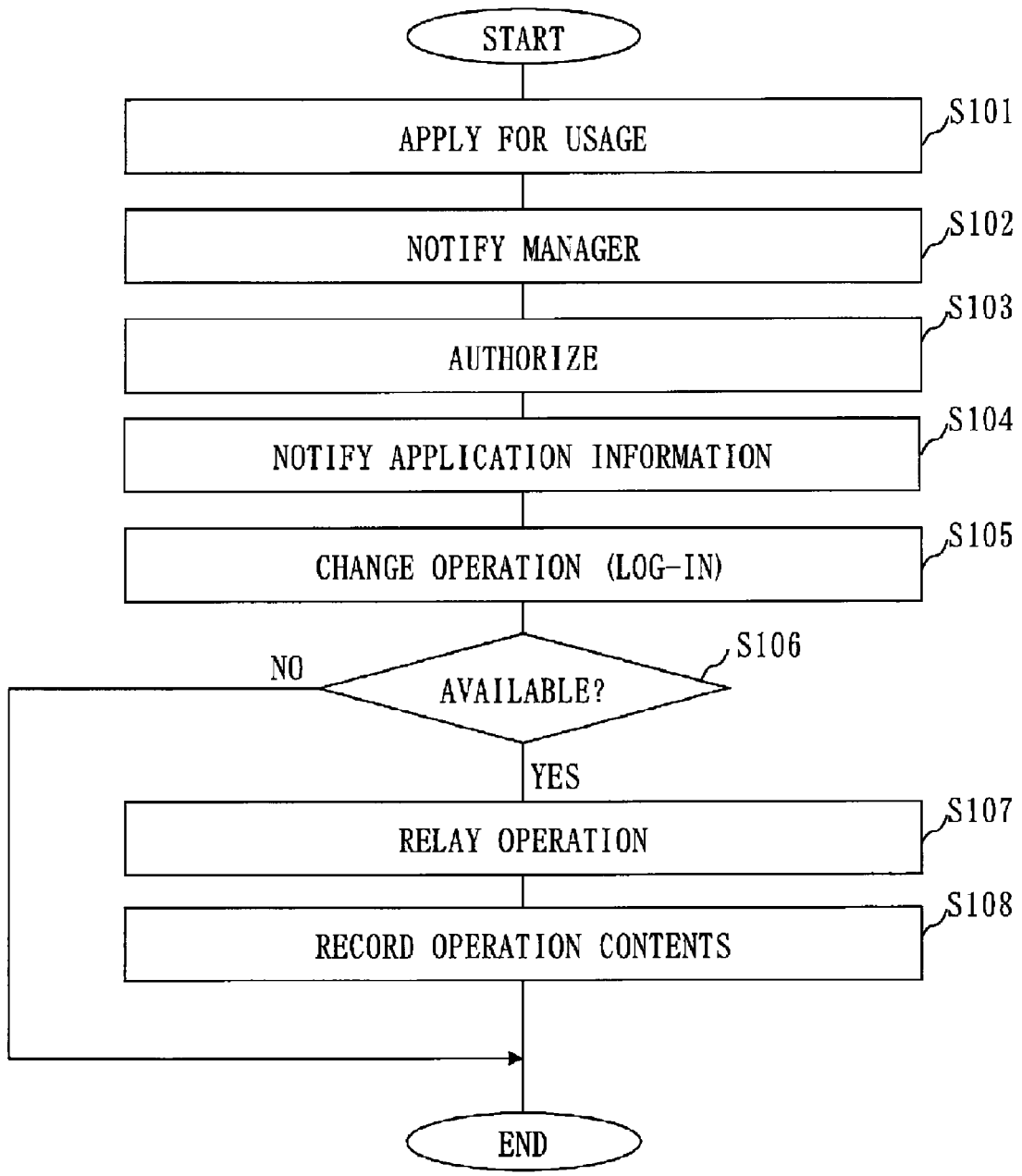
FIG. 3 is a diagram of the first embodiment; and is a flowchart illustrating a changing operation to a business server 600 by an operator Y.

FIG. 3 is a flowchart illustrating changing operation to the business server 600 by the operator Y.

FIG. 4 is a sequenced diagram of FIG. 3.

When a correction module of the business server 600 is opened by the vendor, or when a customer desires to use the business server 600, the operator Y logs in the business server 600 using a privileged ID (ID with an authority of Administrator) and carries out a changing operation such as module update or setting change. In such a case, in order to prevent an access at an inappropriate timing (incorrect operation such as unnecessary changing operation to the business server 600), the operator Y applies for the usage to the WF server 200.

(S101)

The operator Y transmits application information 401 which is a usage application to use the business server 600 from the operator terminal 400 (communication part 420) to the WF server 200 (S101). The transmission of the application information 401 is like the following: The operator terminal 400 (communication part 420), through communication with the WF server 200 (communication part 220), calls an operation application workflow 201 (noted as an application WF 201, hereinafter) from the WF server 200. A processing part 430 of the operator terminal 400 displays the application WF 201 on a screen of the operator terminal 400. The operator Y writes the application information 401 in the application WF 201 displayed on the screen (the processing part 430 carries out writing process).

The communication part 420 transmits the application WF 201, in which the application information 401 is written, to the WF server 200.

FIG. 5 illustrates contents of the application information 401.

FIG. 6 illustrates a specific example of the application information 401. As illustrated in FIG. 5, the application information 401 includes the following information (1) to (5).

(1) Privileged ID 11

The privileged ID 11 is an account to log in the business server 600. It is desirable that password information is managed by the ID control part 500, and appended for relay (retention of the ID and the password for log-in by the ID control part 500, which will be discussed later at S105, and the privileged ID); however, the privileged ID 11 may be included in the application information 401.

(2) User Information 12

The user information 12 is information to identify the operator Y; for instance, it is an identifier (ID) of the operator Y.

(3) Business Server Identifier 13

The business server identifier 13 is an identifier such as a host name of the business server 600 to be logged in.

(4) Period of Use 14

The period of use 14 (planned access period information) is a period indicating from when to when an operation according to the application contents of the application information 401 will be executed.

(5) Command/Protocol to be Used 15

The command/protocol to be used 15 is a command or a protocol indicating which protocol is to be used for accessing or which operation (command) is to be executed on the business server 600.

(S102)

The WF server 200 (communication part 220) receives the application information 401. A processing part 230 issues a slip of the application information 401, and as well the communication part 220 notifies the manager terminal 300 of a manager X of an authorization request for the application information 401 via an electronic mail and the like (S102).

(S103)

The manager X displays, through the communication with the WF server 200 by the manager terminal 300 (communication part 320), the application WF 201 on a screen of the manager terminal 300. The application WF 201 is displayed by a processing part 330. The manager X checks the contents of the application information 401 using the application WF 201, and authorizes the application information 401 if there is no problem (S103). The authorization status is written in the application WF 201 by the processing part 330, and transmitted to the WF server 200 from the manager terminal 300 (communication part 320).

(S104)

The processing part 230 of the WF server 200 records that the application information 401 has been authorized in the application log 211. Further, the communication part 220 notifies the ID control part 500 of the application information 401 (S104).

FIG. 7 illustrates contents of information included in the application log 211. In the application log 211, a plurality of application records to apply for an access to the business server 600 is recorded. One application forms one application record (one record). The application information 401 of FIG. 4 (S101) is one application record recorded in the application log 211. Further, the application log 211 of FIG. 7 illustrates one application record.

With one application record, a privileged ID 11 is associated, and the application record includes a period of use 14 (planned access period information). In addition, one application record includes a command/protocol to be used 15 (planned command information). Items from the privileged ID 11 to the command/protocol to be used 15 in FIG. 7 are from the privileged ID 11 to the command/protocol to be used 15 in FIG. 5. Authorization status 16 is authorized result by the manager terminal 300.

FIG. 8 is a specific example of the application log 211. As for the contents of the item of the command/protocol to be used 15 in FIG. 8, for instance, commands of Telnet may be grouped into a white list, a black list, and the like, and information showing which white list (or other than black list) is specified may be recorded.

(S105)

The operator Y carries out, by the operator terminal 400, when the planned date and time (registered in the application WF 201) has come, a log-in operation to the ID control part 500 for changing operation using Telnet or a remote desktop protocol (RDP) (S105). The log-in processing of the operator terminal 400 is executed by the processing part 430. An ID and a password are used for this log-in; a pair of the ID and the password to identify the operator Y, which is previously registered in the ID control part 500, is used. For instance, the ID is an ID of the operator Y of the user information 12 in FIG. 5 and the password is a password supplied to the operator Y to use an intra-company system. In the ID control part 500, pairs of the ID and the password are registered.

(S106)

The ID control part 500 checks, from the ID and the protocol which the operator Y uses, whether there exists the corresponding application information 401 and further, whether it is an access within the applied period of use, to determine the availability of the usage (S106). The ID control part 500 has already received the application information 401 at S104. Therefore, the ID control part 500 compares the ID for the log-in at S105 and the protocol to be used with the user information 12 and the command/protocol to be used 15 of the application information 401 (FIG. 5), and thereby it is confirmed that there exists the application information 401 corresponding to the log-in at S105. If the application information 401 exists, the ID control part 500 determines whether the log-in at S105 is within the period of use 14 of the application information 401.

(S107, S108)

If the application information 401 does not exist or the log-in is not within the period of use, the usage is not available. In this case, the ID control part 500 discards the request from the operator Y (operator terminal 400). In case of "available" (when the application information 401 exists and the log-in is within the period of use), the ID control part 500 relays the contents of the changing operation by the operator terminal 400 (processing part 430) to the business server 600 (S107). In case of the relay, the ID control part 500 logs in the business server 600 using the privileged ID written in the notified application information 401 and relays the contents of the changing operation. Further, the ID control part 500 records the contents of the changing operation to be relayed in an operation log 511 (S108). Here, as discussed in the explanation for the item of the privileged ID 11 in FIG. 5, if the privileged ID 11 is not written in the application information 401, the ID control part 500 may be configured to previously retain the privileged ID associated with the pair of ID and password used for the log-in at S105.

FIG. 9 illustrates contents of the operation log 511 (access status) recorded by the ID control part 500.

FIG. 10 illustrates a specific example of the operation log 511. A privileged ID 11-5, a user information 12-5, and a period of use 14-5 (access period information) in FIG. 9 correspond to the privileged ID 11, the user information 12, and the period of use 14 in FIG. 5. Further, operation contents 17-5 corresponds to the command/protocol to be used 15 of the application information 401 in FIG. 5. In the operation log 511, a plurality of operation records is recorded. The contents of one changing operation to be relayed is one operation record. FIGS. 9 and 10 illustrate one operation record. The privileged ID 11-5 is the ID which has been used for the log-in at S107. With one operation record, the privileged ID 11-5 is associated. The user information 12-5 is the user information 12 described in the application information 401 which has been confirmed to exist. The period of use 14-5 (access period information) is a relay period. The operation contents 17-5 (relay command information) is a command or a protocol to be used in the relayed changing operation.

(S109)

The business server 600 (processing part 630) records, using a function such as a security log of the OS, the contents of the changing operation relayed by the ID control part 500 in the access log 611.

FIG. 11 illustrates the contents of the access log 611 (accessed status) recorded by the business server 600.

FIG. 12 illustrates a specific example of the access log 611. In the access log 611, a plurality of access records is recorded. One operation (one access) to the business server 600 forms one access record. FIGS. 11 and 12 illustrate one access record. In FIG. 11, an user ID 11-6 is the privileged ID which corresponds to the privileged ID 11-5 of FIG. 9 and is the ID which has been used for the log-in at S107 (FIG. 4). With one access record, the privileged ID is associated. Operation contents 17-6 correspond to the operation contents 17-5 of FIG. 9, and are information of the operation or the command to the business server 600. Date and time of operation 14-6 (accessed period information) corresponds to the period of use 14-5, and is date and time on which the changing operation is executed to the business server 600 from another device.

Figure 13:
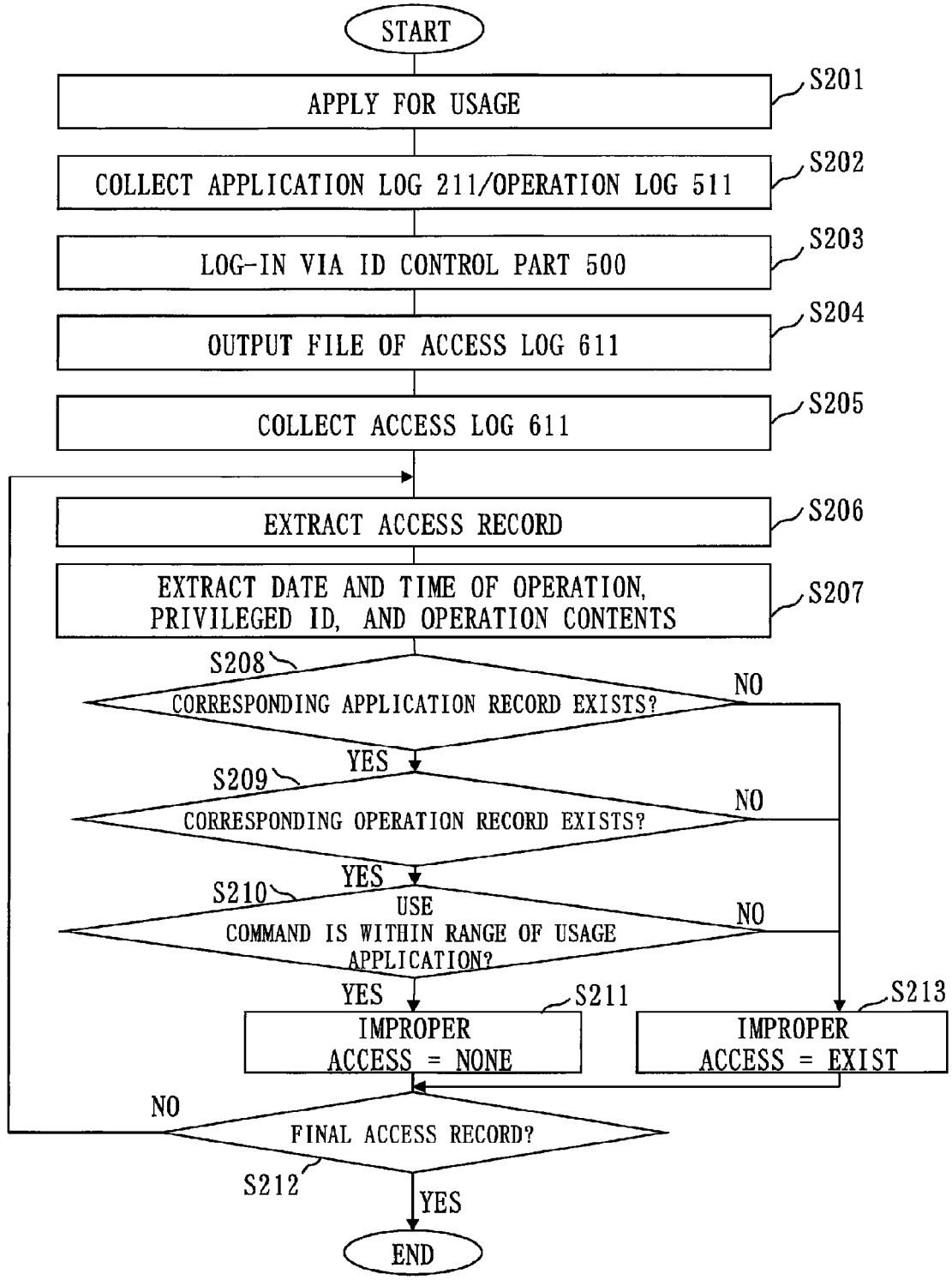
FIG. 13 is a diagram of the first embodiment; and illustrates a flow of a checking operation.
Figure 14:
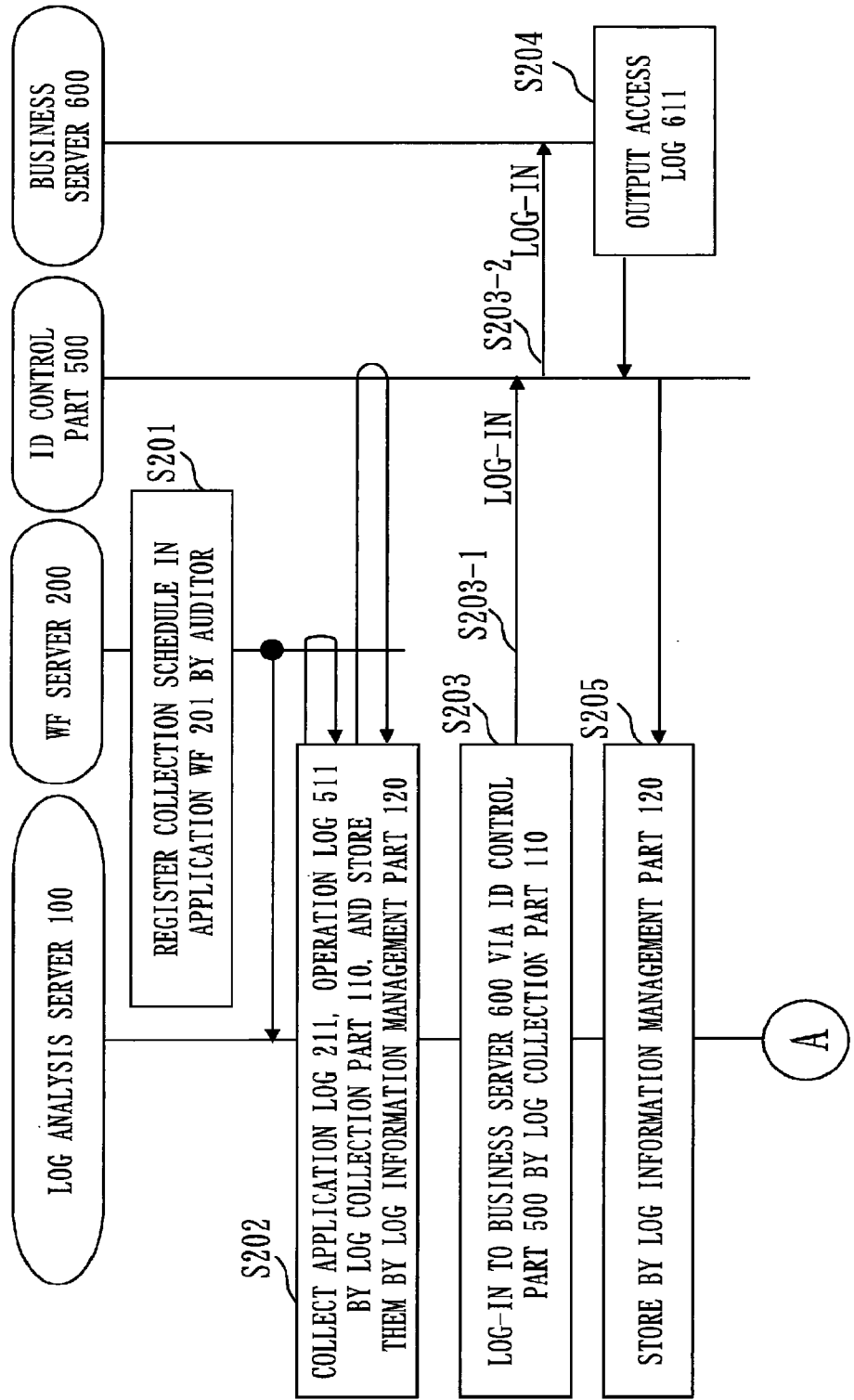
FIG. 14 is a first half of a sequenced diagram of FIG. 13.
Figure 15:
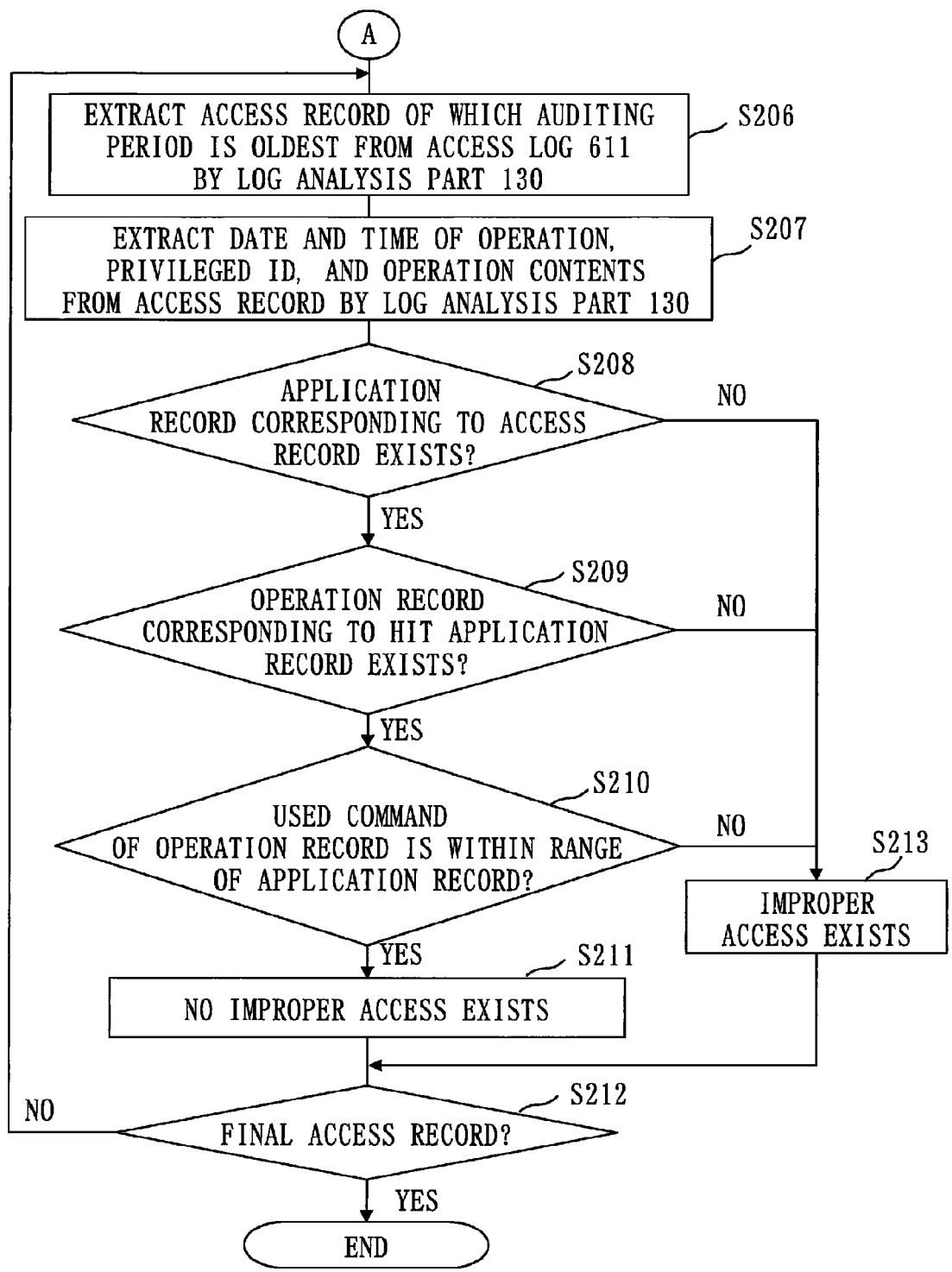
FIG. 15 is a latter half of a sequenced diagram of FIG. 13.

With reference to FIGS. 13 to 15, a flow of a checking operation in the unauthorized access auditing will be explained.

FIG. 13 illustrates a flow of the checking operation.

FIGS. 14 and 15 are sequenced diagrams of FIG. 13; "A" of FIG. 14 is the same as "A" of FIG. 15. FIG. 14 is a sequence of log collection, and FIG. 15 is a sequence of auditing an unauthorized access after collecting the logs.

(S201)

An auditor (a manager X, for instance), using the manager terminal 300 (when the auditor is the manager), previously registers in the application WF 201 schedule (implementing every night, for instance) to collect the application log 211, the operation log 511, and the access log 611, respectively from the WF server 200, the ID control part 500, and the business server 600, thereby applying for the usage (S201). The registration operation of the schedule is executed by the log analysis server 100, via the relay of the ID control part 500 (S203, discussed later) to collect the access log 611 of the business server 600. Further, by the processing part 330 of the manager terminal 300, in addition to the schedule of collecting the logs, "ID and the password" used for the log-in at S203-1 (FIG. 14) and the privileged ID used for the log-in at S203-2 (FIG. 14), which will be discussed later, are registered in the application WF 201. The information of the application WF 201, in which the above is described, is transmitted to the log analysis server 100 by the communication part 320 of the manager terminal 300 (a terminal of the auditor). Here, the schedule and the like are registered in the application WF 201 at S201; however, the schedule, the ID, and the like may be set from the terminal directly to the log analysis server 100.

(S202)

When the planned time has come, the log collection part 110 is activated using a scheduling function of the OS. After activated, the log collection part 110 collects the application log 211 and the operation log 511 using the protocol such as FTP and stores the logs in the log information management part 120 (S202).

(S203)

Further, the log collection part 110 connects, via the ID control part 500, using a function such as remote desktop, the business server 600 to execute the log-in operation (S203). The automation of the log-in operation is implemented by the control of a remote desktop protocol (RDP) or a reproducing function of the key operation to the remote desktop function. For the log-in to the ID control part 500 by the log analysis server 100 (S203-1 in FIG. 14), the pair of "ID and password" registered at S201 is used. For the log-in to the business server 600 by the ID control part 500 (S203-2 in FIG. 14), the privileged ID registered at S201 is used.

(S204, S205)

The processing part 630 of the business server 600 outputs the access log 611 of an auditing target period (S204). The log collection part 110 collects the file output by the processing part 630 (the access log 611) using file-copying or other protocol, via the ID control part 500, and stores the file in the log information management part 120 (S205).

(S206, S207)

Next, the explanation will be done with reference to FIG. 15. At the time of auditing after collecting the logs, the log analysis part 130 extracts from the log information management part 120, one access record having the earliest (oldest) period from among the access logs 611 corresponding to the auditing period (S206). The access log 611 includes the contents of FIG. 11; and in one access record of the access log 611, one operation to the business server 600 is treated as one unit as discussed above. That is, one access record forms one operation. The log analysis part 130 extracts, from the extracted access record, the date and time of operation (date and time of operation 14-6), the implementer of the operation (user ID (privileged ID) 11-6), and the operation contents (operation contents 17-6) (S207). Here, depending on the contents of the access record, the correspondence with the privileged ID is not always recorded in one access record. That is, it is sometimes recorded that one privileged ID is associated with a plurality of operations. In such a case, the log analysis part 130 searches retroactively to the record of the log-in operation, and determines the privileged ID which has been used.

(S208)

S208 is to compare the access record with the application log 211. The log analysis part 130 searches for the application record, in which the privileged ID 11-6 of the access record is equal to the privileged ID 11 and further the date and time of operation 14-6 (accessed period information) of the access record is included in the period of use 14 (planned access period information) among the application logs 211 (S208). If no corresponding application record exists, the log analysis part 130 determines that an improper access (unapplied operation) exists, and it is recorded as the attribute of the access record (S213).

(S209)

S209 is to compare the application record with the operation log 511. If the corresponding application record is hit at S208, the log analysis part 130 searches, using the privileged ID 11 (or the user ID) and the period of use 14 included in the application record as a key, for the operation record of the operation log 511 corresponding to the application record (S209). The following is the search condition: As discussed above, for the hit application record, the privileged IDs (or the user IDs) are equal, and the date and time of start and the date and time of end of the information described in the operation log 511 are included in the period of use 14 of the application record. If there is no operation record corresponding to the hit application record, the log analysis part 130 determines that there is an improper access (an access via a wrong route), and it is recorded as the attribute of the access record corresponding to the hit application record (S213).

(S210)

S210 is to compare the application record hit at S208 with the operation record hit at S209. The log analysis part 130 checks, when the operation record is hit at S209, whether the used command included in the operation contents 17-5 (relay command information) of the hit operation record is equal to the command/protocol to be used 15 of the application record hit at S208 (S210). In this case, the log analysis part 130 confirms that the used command of the operation contents 17-5 of the hit operation record is the command described in the application record, or within the range of the white list and outside the range of the black list. The command is checked by defining a command to be permitted and a command to be prohibited using a character string of the regular expression, and determining based on matching with the regular expression and the like.

Here, depending on the protocol to be used, there is a case where it is difficult to output as a log the information of a command level by the ID control part 500; in such a case, it may be determined by only presence/absence of the operation record.

The log analysis part 130, if the used command of the operation record is outside the range of the application record, determines that there exists an improper access (execution of an unpermitted command), and it is recorded as the attribute of the record (S213).

(S211)

The log analysis part 130, if the used command is within the range of the application record (the authorized command), records that it is a proper access as the attribute of the access record (there exists no improper access) (S211).

(S212)

The log analysis part 130 repeatedly executes the processes from S206 to S212 until the final access record (the latest access record) of the access log 611 in the auditing target period (S212).

Through the above operation, the log analysis part 130 can determine the access record which satisfies the following conditions (1) to (3) as a proper access, and the access record which does not satisfy the conditions as an improper access.

(1) There exist all of corresponding application log 211, operation log 511, and access log 611.

That is, all of the corresponding application record, operation record, and access record exist. This is a case of YES at S208 and also YES at S209.

(2) The operation record recorded in the operation log 511 is within the period of use of the application record recorded in the application log 211. This is a case of YES at S209.

(3) The command of the access record recorded in the access log 611 is within the range of the application record.

This is a case of YES at S210.

FIG. 16 is a diagram illustrating correspondence between a type of access and a log. "○" indicates there exists description (record) in the log, and "x" indicates there is no description (record). For instance, "proper" indicates a case where all information (record) of the corresponding application log 211, operation log 511, and access log 611 are described; and "improper (unapplied)" indicates a case where no information is described for the application log 211, the operation log 511, and the access log 611. "*" of "Δ" in FIG. 16 indicates the following: Since there may be a case where the operation of an external perpetrator is accidentally executed within the applied period of use (may be a case of ○); the application log 211 is compared with the operation log 511, and thereby it is determined whether it is an authorized access.

Embodiment 2

Figure 17:
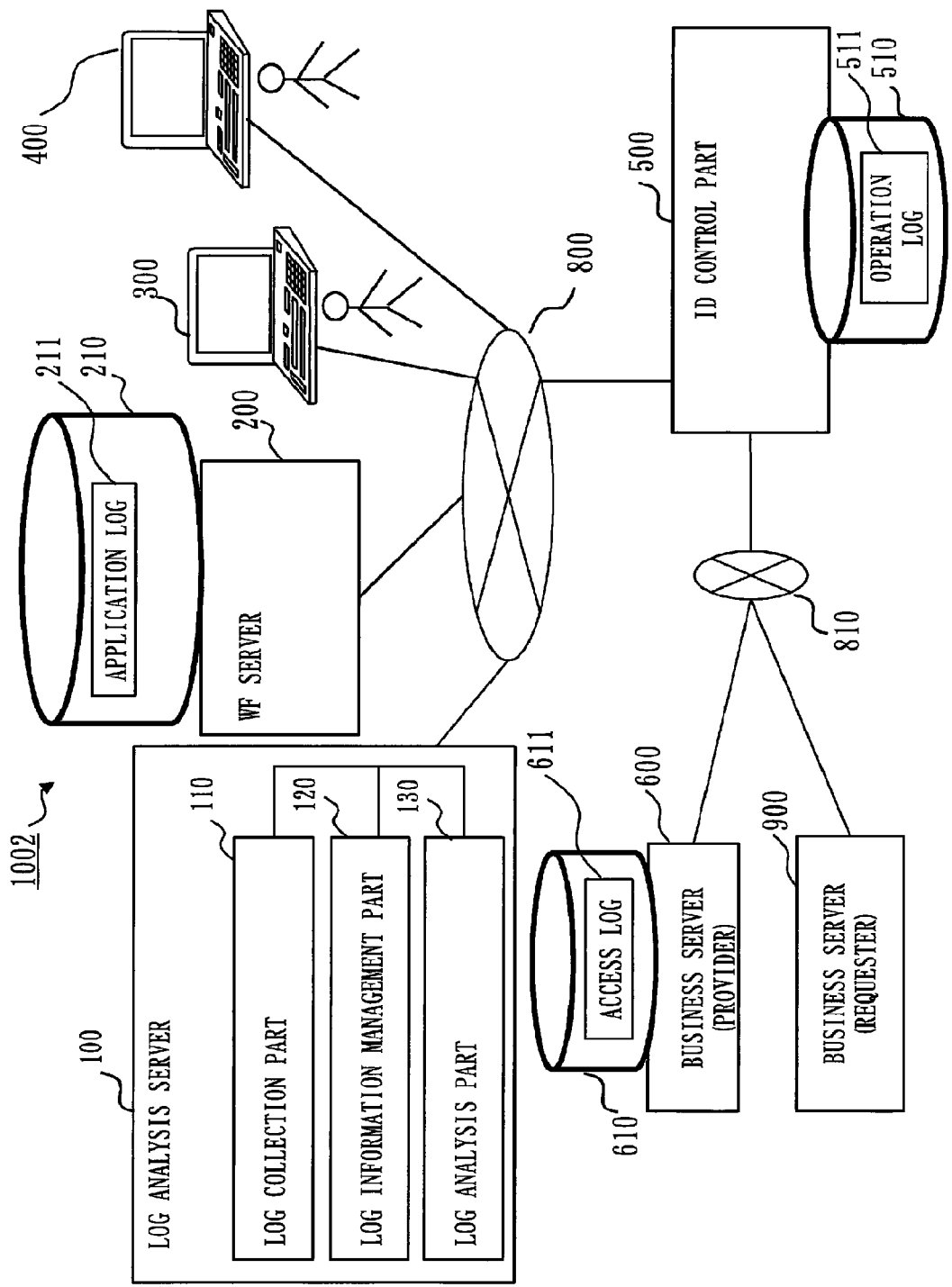
FIG. 17 is a diagram of a second embodiment; and is a configuration diagram of an unauthorized access auditing system 1002.
Figure 18:
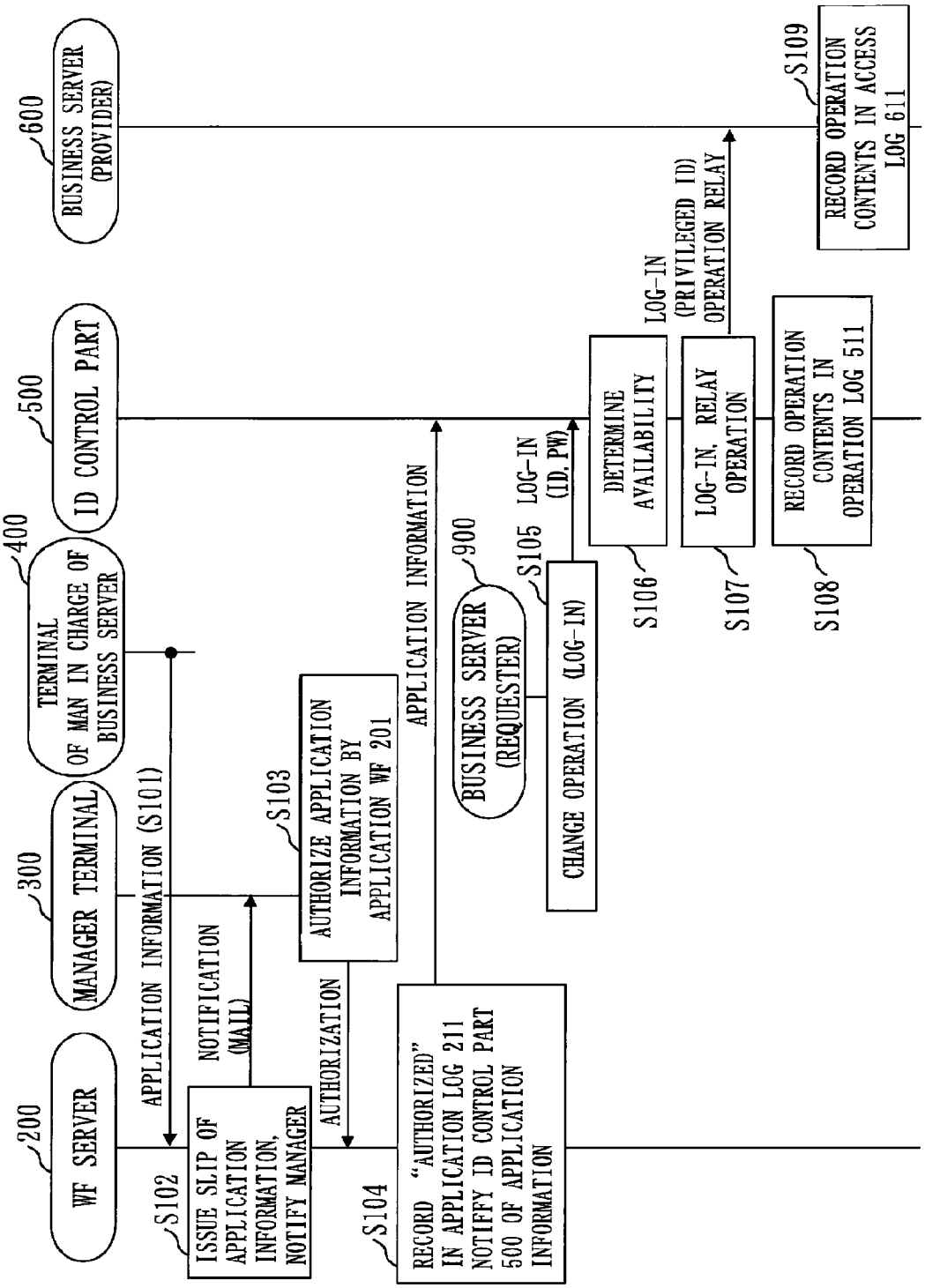
FIG. 18 is a diagram of the second embodiment; and is a sequence diagram corresponding to FIG. 4.

With reference to FIGS. 17 to 19, an unauthorized access auditing system 1002 of a second embodiment will be explained. The second embodiment is a system to check presence/absence of unauthorized access when call relation exists using the privileged ID among the business servers, as will be discussed below.

FIG. 17 is a configuration diagram of the unauthorized access auditing system 1002 in case where a call exists among the business servers. Different from the unauthorized access auditing system 1001, in the unauthorized access auditing system 1002, the business server 600 being a provider and a business server 900 (access device) being a requester are connected to the management network 810. In this manner, among the business servers, there exist the business server 600 (provider) which is called and the business server 900 (requester) which calls. According to the configuration of application on the business server, the provider is sometimes also the requester.

As for the network setting (and the business application setting), a call from the business server 900 (requester) is to be connected to the business server 600 (provider) via the ID control part 500 connected to the management network 810.

FIG. 18 is a diagram corresponding to FIG. 4. In FIG. 18, the operator terminal 400 is a person in charge of the business server; further, while the operator terminal 400 logs in the ID control part 500 (S105) in FIG. 4, the business server 900 logs in and accesses the business server 600 in FIG. 18. Information to be recorded in the application log 211, the operation log 511, and the access log 611 are the same as the ones of FIG. 4. Here, the information to be recorded in the operation log 511 and the access log 611 are contents of the access by the business server 900.

In the audit of unauthorized access of the business server 900, at the step of applying for usage (S201) in "a flow of the checking operation" of FIG. 13 (FIG. 14), information such as a period of use, a privileged ID to be used and the like is input. The subsequent processes are the same as the ones of FIG. 13 (FIGS. 14 and 15) of the first embodiment.

FIG. 19 is a diagram illustrating correspondence between a type of access and a log, which is the same as FIG. 16 of the first embodiment. The contents of FIG. 19 are the same as the ones of FIG. 16.

The second embodiment enables to detect the access among the business servers, and the access from the external perpetrator within the applied period of use, and thereby the improper access can be correctly checked.

Since the access among the business servers can be properly checked, the second embodiment eliminates exceptional processing at the time of auditing, and thereby the auditing operation can be more efficient and automated. Further, the access from the external perpetrator, which has not been fully determined, can be determined to be improper.

Embodiment 3

Figure 20:
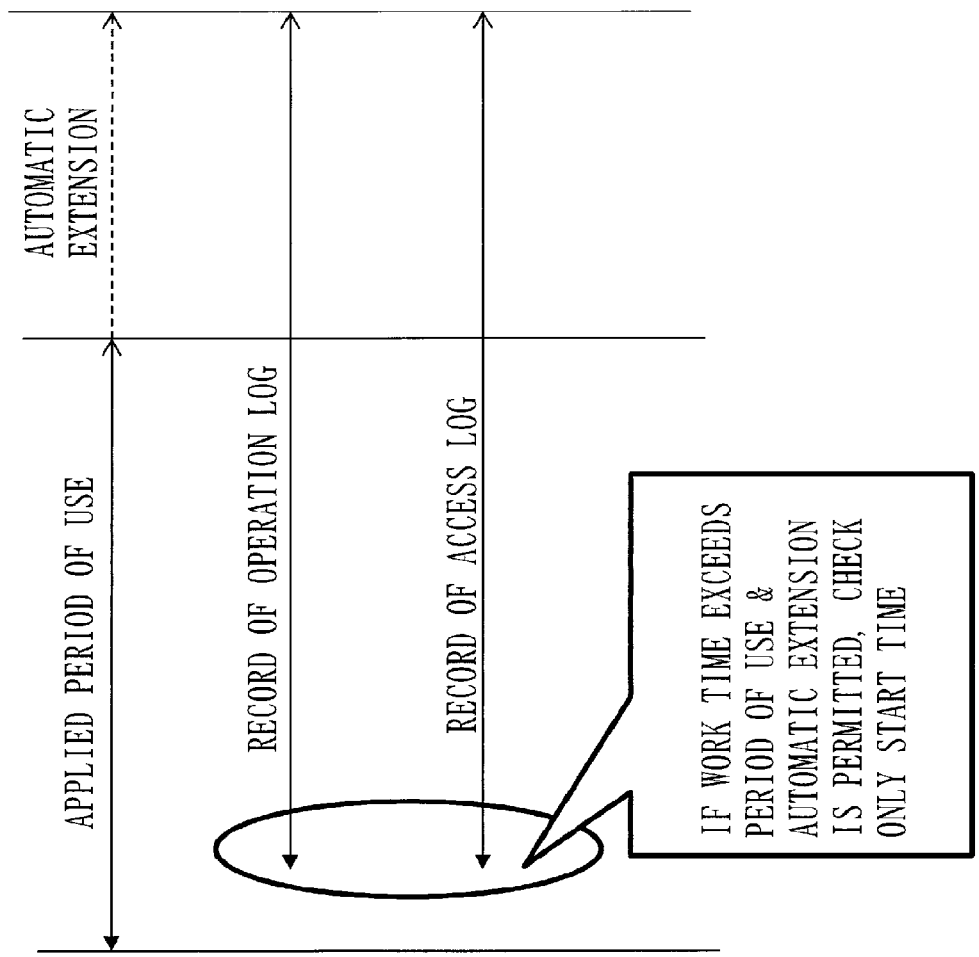
FIG. 20 is a diagram of a third embodiment; and illustrates a determination method at the time of automatic extension.

With reference to FIG. 20, an unauthorized access auditing system 1003 (not illustrated) of a third embodiment will be explained. The configuration of the unauthorized access auditing system 1003 is the same as the configuration of the unauthorized access auditing system 1001 (FIG. 1) or the unauthorized access auditing system 1002 (FIG. 17). The third embodiment is configured to, with consideration of a case where the operation of the ID control part 500 is delayed, automatically extend the permission of (or permit by setting) the period of use. An extension processing is carried out in a case where the corresponding session continues beyond the applied period of use and the like.

In a case of setting where the extension processing is permitted, the application information 401 includes information of permission/prohibition of automatic extension. Therefore, at the time of collecting logs by the log collection part 110, the application logs 211 are collected including information of the automatic extension.

FIG. 20 is a diagram illustrating a determination method by the log analysis part 130 at the time of automatic extension.

As illustrated in FIG. 20, the log analysis part 130 carries out determination based on only the start time in a case where both of the following conditions are satisfied:

(1) there exists a record (a record of the access log) of which the operation time exceeds the period of use (2) the automatic extension is permitted The other processing are the same as the ones of the first embodiment.

Specifically, the application record includes extension information indicating the availability of extension for the planned period of access to the business server 600. The log analysis part 130 determines, with reference to the availability indicated by the extension information, whether or not the application record corresponding to the access record is recorded in the application log 211 (S208), and whether or not the operation record corresponding to the application record is recorded in the operation log 511 (S209). Accordingly, even if a regular session is continued beyond the applied period of use due to the operation delay of the ID control part 500, it can be treated as an authorized access.

The first to third embodiments have been discussed above; among these embodiments, two or more embodiments may be combined and implemented. Or, among these embodiments, one embodiment may be partially implemented. Or, among these embodiments, two or more embodiments may be partially combined and implemented. Here, the present invention is not limited to these embodiments, but various alteration can be done according to the necessity.

Embodiment 4

Figure 21:
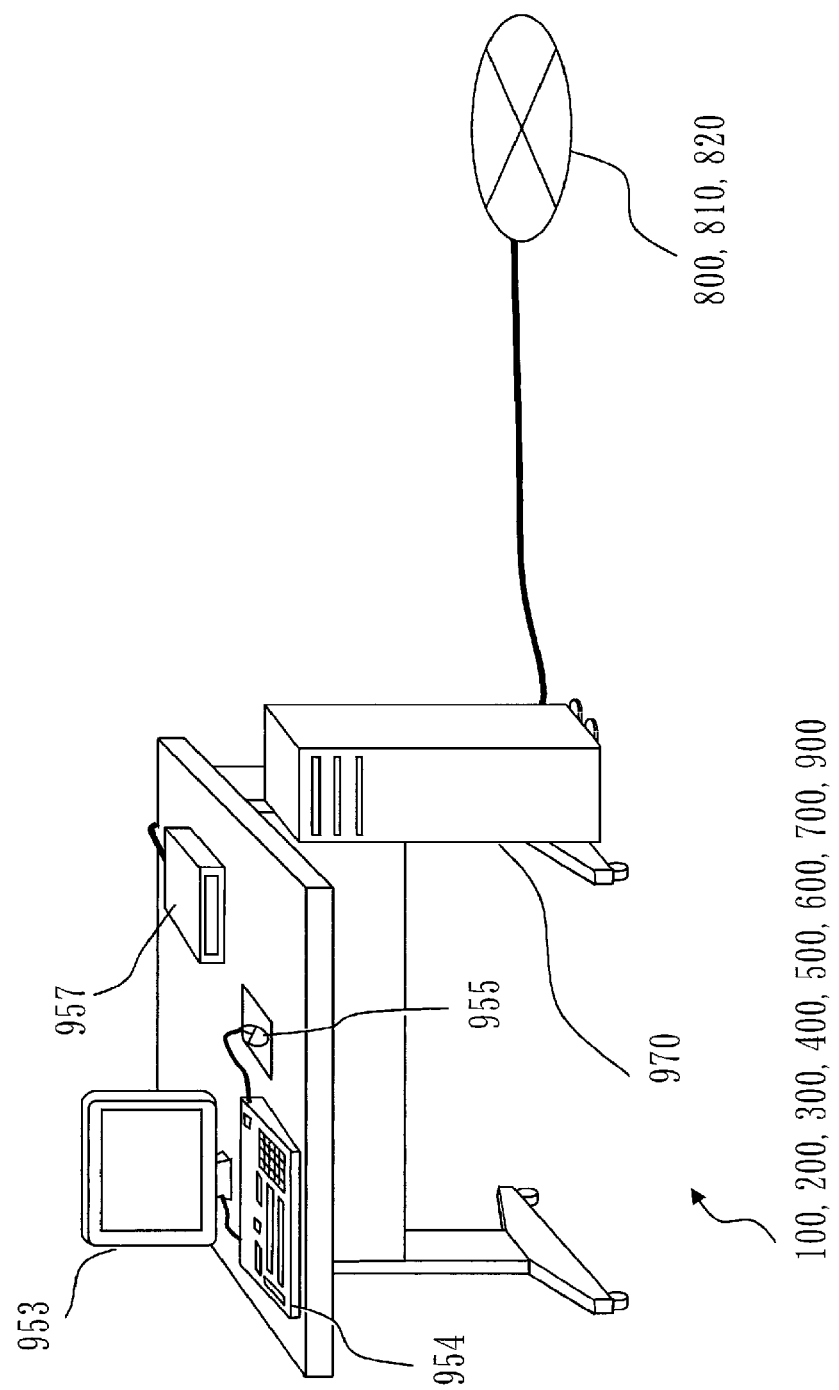
FIG. 21 is a diagram of a fourth embodiment; and illustrates an example of an external appearance of the log analysis server 100.
Figure 22:
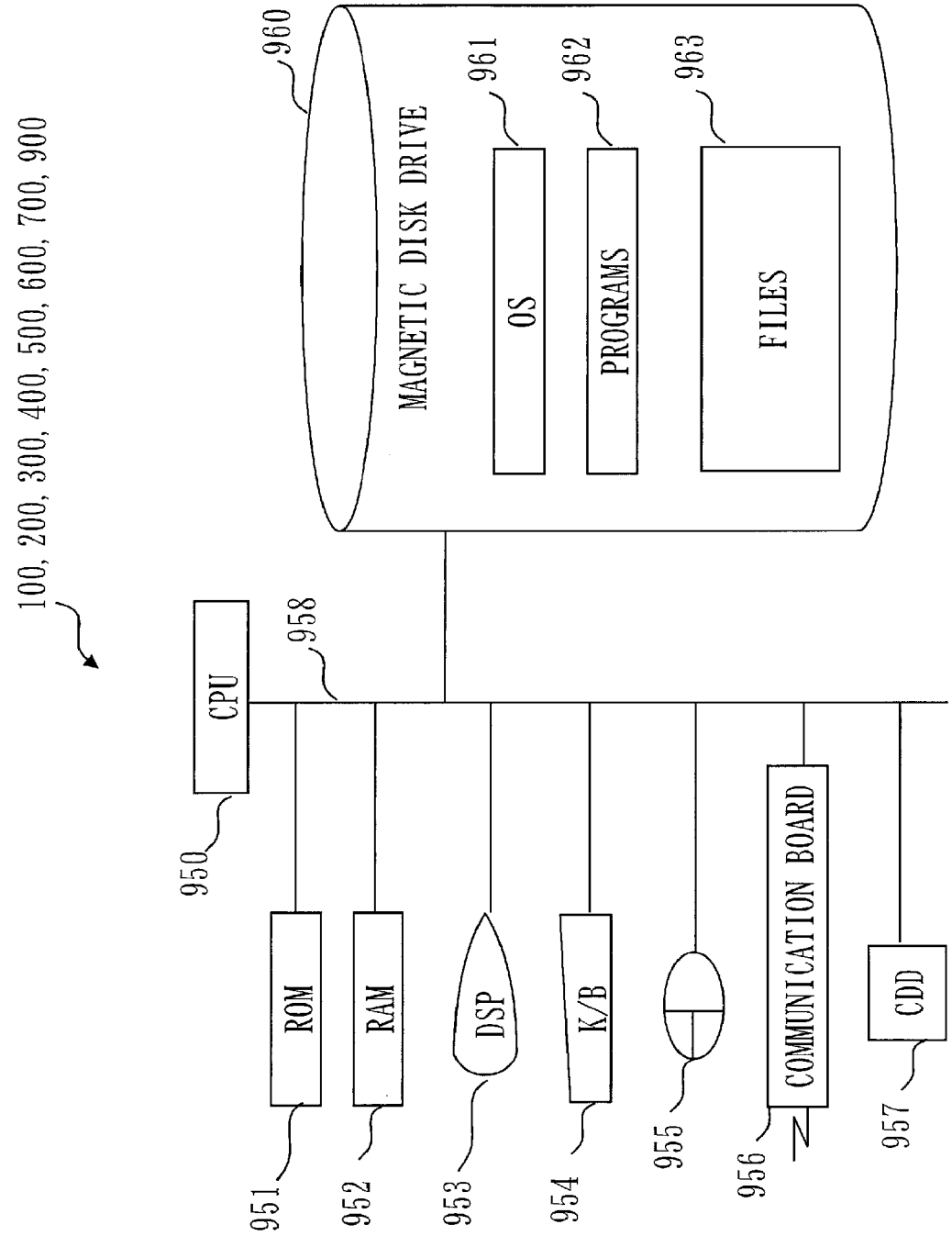
FIG. 22 is a diagram of the fourth embodiment; and illustrates an example of a hardware configuration of the log analysis server 100.

With reference to FIGS. 21 and 22, a fourth embodiment will be explained. The fourth embodiment will explain a hardware configuration of the log analysis server 100 being a computer. Here, the WF server 200, the manager terminal 300, the operator terminal 400, the ID control part 500, the business server 600, the user terminal 700, and the business server 900 are computers being similar to the log analysis server 100. Therefore, the following explanation of log analysis server 100 can be also applied to the WF server 200 and the like.

FIG. 21 is a diagram illustrating an example of an external appearance of the log analysis server 100 being a computer. FIG. 22 illustrates an example of hardware resource of the log analysis server 100.

In FIG. 21 illustrating the external appearance, the log analysis server 100 includes hardware resource such as a system unit 970, a display device 953 having a display screen such as CRT (Cathode Ray Tube) and LCD (Liquid Crystal), a keyboard 954 (K/B), a mouse 955, a compact disk drive 957 (CDD), and the like, and they are connected via cables or signal lines. The system unit 970 is connected to the business networks 800, 810, and 820.

Further, in FIG. 22 illustrating the hardware resource, the log analysis server 100 includes a CPU 950 (Central Processing Unit) which executes programs. The CPU 950 is connected, via a bus 958, to a ROM (Read Only Memory) 951, a RAM (Random Access Memory) 952, the display device 953, the keyboard 954, the mouse 955, a communication board 956, the CDD 957, and a magnetic disk drive 960, and controls these hardware devices. The magnetic disk drive 960 can be replaced with memory devices such as an optical disk drive and a flash memory The RAM 952 is an example of a volatile memory. A storage medium such as the ROM 951, the CDD 957, the magnetic disk drive 960, and the like are examples of a non-volatile memory. These are examples of a memory device, a memory part, a storage part, and a buffer. The communication board 956, the keyboard 954, and the like are examples of an input part and an input device. Further, the communication board 956, the display device 953, and the like are examples of an output part and an output device. The communication board 956 is connected to the network.

The magnetic disk drive 960 stores an operating system 961 (OS), programs 962, and files 963. Programs of the programs 962 are executed by the CPU 950 and the operating system 961.

The programs 962 store programs to execute the functions explained in the above embodiments as "part". The programs are read and executed by the CPU 950.

The files 963 store information such as "determination result", "calculation result", "extraction result", "generation result", "processing result", and the like, data, signal values, variable values, and parameters as each item of "file" or "database". "File" or "database" are stored in a recording medium such as a disk or a memory. Further, information, data, signal values, variable values, and parameters stored in the storage medium such as a disk or a memory are read by the CPU 950 via a read/write circuit to the main memory or the cache memory and used for the operation of the CPU such as extraction, search, reference, comparison, computation, calculation, processing, output, printing, display, and so on. Information, data, signal values, variable values, and parameters are temporarily stored in the main memory, the cache memory, or the buffer memory during the operation of the CPU such as extraction, search, reference, comparison, computation, calculation, processing, output, printing, and display.

Further, in the above explanation of the embodiments, the data and the signal values are recorded in the storage medium such as a memory of the RAM 952, a compact disk of the CDD 957, a magnetic disk of the magnetic disk drive 960, and others like an optical disk, a mini-disk, a DVD (Digital Versatile Disk). Further, the data and the signals are transmitted on-line via a transmission medium such as the bus 958, the signal lines, the cables, and others.

Further, in the explanation of the above embodiments, what has been explained as a "part" can be "means", and further, can be also a "step", a "procedure", and a "process". That is, the "part" can be implemented by only software, by a combination of the software and the hardware, and further by a combination with the firmware. The firmware and the software are stored as the programs in the storage medium such as the magnetic disk, the flexible disk, the optical disk, the compact disk, the mini disk, the DVD, and the like. The programs are read by the CPU 950, and executed by the CPU 950. That is, the programs are to function a computer to be the "part" which has been discussed above. Or the programs are to cause the computer to perform the procedure or the method of "part".

In the above embodiments, the log analysis server 100 has been explained; however, it is as a matter of course that the operation of the log analysis server 100 can be considered as a program from the above explanation. Further, it is clear that the operation of each "part" of the log analysis server 100 can be considered as a log analysis method from the above explanation.

REFERENCE SIGNS LIST

X: manager; Y: operator; 100: log analysis server; 110: log collection part; 120: log information management part; 130: log analysis part; 200: WF server; 201: operation application WF; 210: storage part; 211: application log; 300: manager terminal; 400: operator terminal; 500: ID control part; 510: storage part; 511: operation log; 600: business server; 610: storage part; 611: access log; 700: user terminal; 800: business network; 810: management network; 820: service network; 900: business server; and 1001, 1002, 1003: unauthorized access auditing system.

The invention claimed is:

1. A log analysis device comprising:
a memory;
a processor connected to the memory and configured to
collect an application log from an application log retention device retaining the application log in which a plurality of application records to apply for an access to a server device to be accessed is recorded,
collect an operation log from an access relay device which retains the plurality of application records notified from the application log retention device, receives a log-in to access the server device to be accessed from an access device, determines whether the application record corresponding to the log-in exists, if the application record exists, relays an access from the access device to the server device to be accessed, and as well records access status to the server device to be accessed by the access device as an operation record in the operation log,
collect an access log from the server device to be accessed which records accessed status as an access record in the access log, and
determine, based on whether an application record in the application log corresponds to an access record in the access log and corresponds to an operation record in the operation log, whether or not the accessed status recorded as the access record is an authorized access.

2. The log analysis device of claim 1,
wherein the processor logs in the access relay device, and collects the access log from the server device to be accessed via the logged-in access relay device.

3. The log analysis device of claim 1,
wherein the access device is one of a terminal device of an operator of an unauthorized access auditing system, in which the log analysis device is used, the terminal device used with the log analysis device, and a requester server device being a requester which accesses the server device to be accessed as a provider.

4. The log analysis device of claim 1,
wherein the processor compares the access log with the application log, thereby determining whether the application record corresponding to the access record recorded in the access log is recorded in the application log, and if the application record is recorded in the application log, the processor determines whether the operation record corresponding to the application record is recorded in the operation log, thereby determining whether or not the accessed status recorded as the access record is the authorized access.

5. The log analysis device of claim 4, wherein
the application record, the operation record, and the access record are associated with a privileged ID which is authorized to log in the server device to be accessed,
the application record includes planned access period information to access the server device to be accessed,
the operation record includes access period information to access the server device to be accessed by the access device,
the access record includes accessed period information,
the processor
determines, based on the privileged ID corresponding to the access record and the access period information included in the access record, and the privileged ID corresponding to the application record and the planned access period information included in the application record, whether or not the application record corresponding to the access record is recorded in the application log, and
determines, based on the privileged ID corresponding to the application record and the planned access period information included in the application record, and the privileged ID corresponding to the operation record and the access period information included in the operation record, whether or not the operation record corresponding to the application record is recorded in the operation log.

6. The log analysis device of claim 5, wherein
the application record includes a planned command to be used for accessing the server device to be accessed,
the operation record includes a relay command which has been used for relayed access, and
the processor determines, if the operation record corresponding to the application record is determined to be recorded in the operation log, based on the planned command included in the application record and the relay command included in the operation record, whether or not the accessed status recorded as the access record is an authorized access.

7. The log analysis device of claim 5, wherein
the application record includes extension information indicating availability of extension of a planned access period to access the server device to be accessed, and
the processor, with reference to the availability indicated by the extension information, determines whether or not the application record corresponding to the access record is recorded in the application log, and determines whether the operation record corresponding to the application record is recorded in the operation log.

8. An unauthorized access auditing system comprising:
a server device to be accessed which records accessed status as an access record in an access log;
an application log retention device which retains an application log in which a plurality of application records applying for an access to the server device to be accessed is recorded;
an access relay device which retains the plurality of application records notified from the application log retention device, receives a log-in to access the server device to be accessed from an access device, determines whether the application record corresponding to the log-in exists, if the application record exists, relays the access from the access device to the server device to be accessed, and as well records access status to the server device to be accessed by the access device as an operation record in an operation log; and
a log analysis device to collect the access log, the application log, and the operation log respectively from the server device to be accessed, the application log retention device, and the access relay device, and to determine, based on whether an application record in the application log corresponds to an access record in the access log and corresponds to an operation record in the operation log, whether or not the accessed status recorded as the access record is an authorized access.

9. A non-transitory computer-readable medium storing a log analysis program to cause a computer to execute a method comprising:
collecting an application log from an application log retention device retaining an application log in which a plurality of application records to apply for an access to a server device to be accessed is recorded, collecting an operation log from an access relay device which retains the plurality of application records notified from the application log retention device, receives a log-in to access the server device to be accessed from an access device, determines whether the application record corresponding to the log-in exists, if the application record exists, relays an access from the access device to the server device to be accessed, and as well records access status to the server device to be accessed by the access device as an operation record in the operation log, collecting an access log from the server device to be accessed which records accessed status as an access record in the access log, and determining, based on whether an application record in the application log corresponds to an access record in the access log and corresponds to an operation record in the operation log, whether or not the accessed status recorded as the access record is an authorized access.

10. A log analysis method implemented by a log analysis device, the method comprising:

collecting an application log from an application log retention device retaining an application log in which a plurality of application records to apply for an access to a server device to be accessed is recorded, collecting an operation log from an access relay device which retains the plurality of application records notified from the application log retention device, receives a log-in to access the server device to be accessed from an access device, determines whether the application record corresponding to the log-in exists, if the application record exists, relays an access from the access device to the server device to be accessed, and as well records access status to the server device to be accessed by the access device as an operation record in the operation log, collecting an access log from the server device to be accessed which records accessed status as an access record in the access log, and determining, based on whether an application record in the application log corresponds to an access record in the access log and corresponds to an operation record in the operation log, whether or not the accessed status recorded as the access record is an authorized access.

* * * * *